United States Patent [19]

Fried

[11] 4,367,455

[45] Jan. 4, 1983

[54] POWERSAVING ROOM SECURITY SYSTEM

[76] Inventor: Morton Fried, 706 Bolton Rd., Far Rockaway, N.Y. 11691

[21] Appl. No.: 233,830

[22] Filed: Feb. 12, 1981

[51] Int. Cl.[3] .............................................. H04B 3/54

[52] U.S. Cl. ................................ 340/310 A; 340/538; 340/825.37

[58] Field of Search ............. 340/310 R, 310 CP, 538, 340/825.3, 825.37

[56] References Cited

U.S. PATENT DOCUMENTS

| | | | |
|---|---|---|---|
| 3,696,383 | 10/1972 | Oishi et al. | 340/310 R |
| 3,729,710 | 4/1973 | Sherwin | 340/310 CP |
| 3,959,607 | 5/1976 | Vargo | 340/825.3 |
| 4,200,862 | 4/1980 | Campbell et al. | 340/310 CP |
| 4,217,646 | 8/1980 | Caltagirone et al. | 340/310 R |
| 4,223,301 | 9/1980 | Grimes et al. | 340/825.37 |

FOREIGN PATENT DOCUMENTS

| | | | |
|---|---|---|---|
| 2039402 | 8/1980 | United Kingdom | 340/538 |

*Primary Examiner*—Donald J. Yusko

[57] ABSTRACT

A powersaving room security system including a switch connected to a door locking system which generates a lock signal congruous to proper locking of the door. A central control unit produces control signals which can be transmitted through the room AC lines. The control signal corresponds to the existence of the lock signal. Module units are respectively connected to each of the various electrical wall switches and receptacles in the room and respond to the control signals for correspondingly controlling the respective receptacles and wall switches. In this way, lights and appliances in the room can only be permanently energized from the room AC lines when the door of the room is properly locked. At the same time, the system provides an energy saving system by turning off all appliances and lights which the guests may have left on without leaving the room.

19 Claims, 1 Drawing Figure

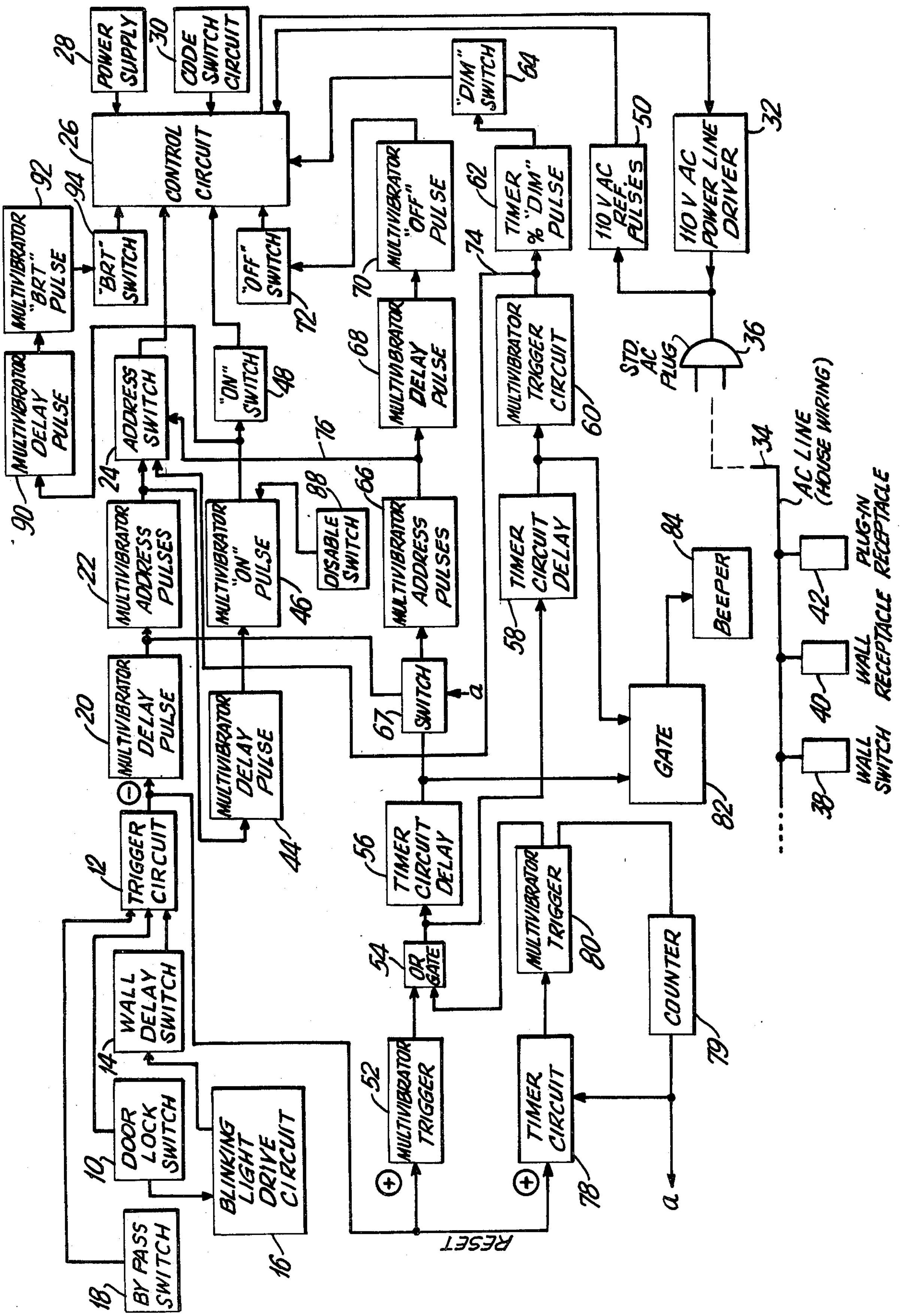
POWER SUPPLY
28
CODE SWITCH CIRCUIT
30
CONTROL CIRCUIT
26
"DIM" SWITCH
64
110 V AC REF. PULSES
50
110 V AC POWER LINE DRIVER
32
MULTIVIBRATOR "BRT" PULSE
92
"BRT" SWITCH
94
"OFF" SWITCH
72
MULTIVIBRATOR "OFF" PULSE
70
TIMER % "DIM" PULSE
62
74
STD. AC PLUG
36
MULTIVIBRATOR DELAY PULSE
90
ADDRESS SWITCH
24
"ON" SWITCH
48
MULTIVIBRATOR DELAY PULSE
68
MULTIVIBRATOR TRIGGER CIRCUIT
60
AC LINE (HOUSE WIRING)
34
76
MULTIVIBRATOR ADDRESS PULSES
22
MULTIVIBRATOR "ON" PULSE
46
DISABLE SWITCH
88
MULTIVIBRATOR ADDRESS PULSES
66
TIMER CIRCUIT DELAY
58
BEEPER
84
PLUG-IN RECEPTACLE
42
WALL RECEPTACLE
40
WALL SWITCH
38
MULTIVIBRATOR DELAY PULSE
20
SWITCH
67
a
GATE
82
MULTIVIBRATOR DELAY PULSE
44
TRIGGER CIRCUIT
12
TIMER CIRCUIT DELAY
56
MULTIVIBRATOR TRIGGER
80
OR GATE
54
WALL DELAY SWITCH
14
COUNTER
79
DOOR LOCK SWITCH
10
BLINKING LIGHT DRIVE CIRCUIT
16
MULTIVIBRATOR TRIGGER
52
TIMER CIRCUIT
78
a
RESET
BY PASS SWITCH
18

POWERSAVING ROOM SECURITY SYSTEM

BACKGROUND OF THE INVENTION

This invention relates to a security system, and more particularly to a system which insures the proper locking of doors in hotel rooms, and the like.

One of the biggest problems in hotel and motel security is that the users or residents fail to suitably lock the doors on their rooms. Although the management may provide proper locking mechanisms in the form of dead bolts, chains, latches, etc., all of these will be inadequate if the occupant fails to utilize such locking devices. With an increase in hotel robberies, the mere presence of the locks on the doors may not remove the responsibility of the owners to protect the occupants. Accordingly, it is necessary to provide a system which will insure that the occupant will utilize the locks and accordingly properly protect the room.

Although simple warning signs can be placed on the door of the room, in most cases the occupant may disregard the warning sign if not forced to lock the door. However, thus, far, there has not been found any suitable method to force the occupant to utilize the locking system provided on the door.

Additionally, a great problem faced by the hotel industry is that the guests have a tendency of leaving on the lights, air conditioners, televisions and other electrical equipment even though they leave the room for many hours or even check out of the room. These electrical devices can stay on for a long time until the room is cleaned, at which time the fact that the equipment is still on will be detected. However, the cost of keeping this equipment on for such length of time is exorbitant.

Accordingly, it would be helpful to have a room security system which could solve the security problem by encouraging the guests to suitably lock the doors of the room. At the same time, it would be beneficial if the same security system could also provide a power saving objective by insuring that the electrical equipment is shut down subsequent to the guests leaving the room or checking out of the room.

SUMMARY OF THE INVENTION

Accordingly, it is an object of the present invention to provide a room security system which will insure that the occupant will utilize a door locking system provided in the room.

Another object of the present invention is to provide a room security system which will prevent regular usage of lamps, appliances, and other electrical equipment in the room unless the occupant properly locks the door of the room.

Still another object of the present invention is to provide a room security system which will only permit the electrical equipment and lamps contained in the room to be permanently energized when the door locking system is properly utilized.

A further object of the present invention is to provide a room security system which provides a reminder to the occupant that he must lock his door.

Yet a further object of the present invention is to provide a room security system which controls the operation of the lights and other electrical equipment in the room based upon the proper locking of the door of the room.

A further object of the present invention is to provide a room security system which will insure that the occupant locks his door, and which system is easy to install, simple to utilize, and convenient to maintain.

Still another object of the present invention is to provide a room security system which encourages the occupant to lock his door and which system can be either initially built in to a hotel system or can be added subsequent to the construction of the hotel.

Yet another object of the present invention is to provide a room security system which additionally provides a power saving benefit by shutting down the electrical equipment in the room after a guest leaves the room or checks out of the room.

A further object of the present invention is to provide a room security system which also can control electrical equipment in the room so as to periodically turn on specific ones of the electrical equipment, such as the air conditioner, for a short duration of time so as to maintain comfortable temperatures in the room during the absence of the guest so that upon the guest's return it will not be excessively hot.

Briefly, in accordance with the present invention, there is provided a room security system which includes a switch built into the door locking system which generates a lock signal congruous to proper locking of the door. A central control unit responds to the presence of the lock signal and accordingly produces control signals which are capable of transmission to the room AC lines. Module units are connected to the respective electrical receptacles in the room, including wall sockets, switch units, plug in receptacles, and the like. Each of the modules are responsive to the control signals and correspondingly control the respective receptacle. In this manner, light bulbs and electrical appliances in the room can only be permanently energized from the room AC lines when the door is properly locked.

In an embodiment of the invention, a blinking reminder switch is provided for reminding the occupant to lock the door. Should the occupant turn on the reminder switch, the lights in the room will go on for a prefixed period of time following which they will go out. Toward the end of this period of time, the lights will dim and an audible beeping sound will occur as a further reminder that the lights will shortly go out unless the occupant properly locks the door.

Similarly, after the door is unlocked, the same delay period occurs during which the lights will ultimately dim, the beeping sound will occur and then the lights will go out.

In an embodiment of the invention, there is also provided a continuous timing interval during which time all of the lights in the room will go out. Accordingly, should the occupant switch on any individual light, upon occurrence of the end of the timing period the light will first dim and the beeping sound will occur, and subsequently the light will go out.

Utilizing the continuous timing interval, a power saving feature can be provided. After the individual leaves the room and closes the door, the continuous timing interval will occur for a limited number of times. During this timing interval, the lights will turn on for a short interval. However, the lights will only turn on in a dim fashion during those short intervals. However, after a predetermined number of such intervals, as for example 4, the timing interval will cease occurring. Alternately it can be arranged that the timing interval is extended to occur only at a greater interval, as for example once every hour. Furthermore, during that hourly interval it can be arranged that the air conditioning will turn on for a short period of time, such as for example, 5 or 6 minutes. Thus, the air conditioning will turn on for a short interval every hour during which time it can keep the humidity and temperature in the room down to a somewhat suitable level so that upon a guest's return to the room the room will not be unbearably and uncomfortable hot. At the same time, because of the initial timing intervals, all other electrical equipment and even the air conditioner if so desired, can be automatically turned off even though the guests have left them on. As a result, a tremendous power savings occurs since the appliance will be automatically turned off even though the guest has neglected to do so when he left the room.

Accordingly, the only time that the lights and other electrical appliances can be permanently energized from the room AC lines is when the door is properly locked.

The aforementioned objects, features and advantages of the invention will, in part, be pointed out with particularity, and will, in part, become obvious from the following more detailed description of the invention, taken in conjunction with the accompanying drawing, which forms an integral part thereof.

BRIEF DESCRIPTION OF THE DRAWING

In the drawing, there is shown a block diagram of the circuit of the present invention.

DESCRIPTION OF THE PREFERRED EMBODIMENT

Referring now to the drawing, there is shown a door lock switch 10 which can be connected to any type of secure locking mechanism provided on the door. For example, it can be a contact associated with a safety chain, a switch built into the door jam of a dead bolt lock, or any other switch which is associated with a suitably provided door locking system on the door of a room. The output from the door lock switch feeds into a trigger circuit 12 which has a normally high output which goes low in response to the occurrence of the door lock switch signal and reverts back to its normally high state upon termination of the door lock switch signal. A delay circuit of short time interval such as 2½ seconds, can be built into the switch to prevent errors occurring from repeat presence of a door lock switch signal.

Connected in parallel with the door lock switch is a wall switch 14 which can include an illumination means, such as a red light, which is caused to continuously flash by means of the blinking light drive circuit 16. The wall delay switch 14 provides a momentary door lock signal pulse to the trigger circuit 12.

Also connected in parallel with the door lock switch 10 and the wall delay switch 14, is a bypass switch 18. This switch can be a simple phonojack type switch whose use will be explained hereinafter.

Upon the occurrence of a door lock signal from either of the switches 14, 10 or 18, the trigger circuit goes low and such low state causes the multivibrator 20 to provide a delay pulse used for spacing line signals, as will hereinafter be explained. The output from the multivibrator 20 goes to trigger the multivibrator 22 which provides a series of "address" pulses providing the necessary pulse width for the address signal. This then controls the "address" switch 24 which sends the suitable signal to the control circuit 26 to provide the address relating to the particular room in which the system is connected. The control circuit 26 is energized by means of a power supply 28 and also receives suitable code switch signals from the code switch circuit 30.

The output from the control circuit 26 is sent through the 110 volt AC power line driver 32 onto the AC line 34 by means of a standard AC plug 36 which is plugged into a standard wall receptacle socket.

The control circuit 26 is a General Instrument IC chip No. 542C. Such chip is utilized in a standard wireless remote control system available from BSR Limited, as the X-10 System. Such system utilizes the aforementioned IC chip as part of its remote control center. Such control center produces preset pulse codes which are modulated on a 120 KHz signal which is then sent out onto the usual 60 cps AC house current. Individual modules are available which can be set with a corresponding code number. The modules can be utilized to control applicances, lamps, or wall switches. They each respond to various commands, including the command of turning on, turning off, dimming and brightening.

The control circuit initially sends out a digital address which represents the digital code of the particular module which is desired to be controlled. After that, it sends out a particular command signal in accordance with the command which is desired. Accordingly, the control circuit 26, the code switch circuit 30, the AC power line driver 32, are all parts which are well known and are utilized in connection with the remote control system which is available.

In the present situation, there are utilized a series of modules including the module 38 connected as part of the wall switch, the module 40 connected in the wall receptacle, and the module 42 which is plugged into a receptacle. Each of these are connected off the main AC line 34 which constitutes the house wiring. All of these three, as well as other such modules, which are contained in a single room, are all preset with a single digital code. Each room will have its own control circuit 26 which will send out the address corresponding with the particular digital code for that room's modules. In this manner, if a hotel has many rooms, each room can have its own code and accordingly, the control circuit of that particular room will only address the modules of that corresponding room and will not affect the modules of adjacent rooms since those in the other rooms will have different digital code addresses.

Referring again to the drawing, the output from the multivibrator 22 is also used to trigger a multivibrator delay 44 which produces a pulse which is delayed sufficient time to let the address pulses through. This in turn triggers the multivibrator 46 which provides the necessary "ON" pulse for turning on the switch 48 which in turn sends the signal to the control circuit to send the command onto the AC line to turn on the modules. 110 volt AC references pulses are taken through the circuit 50 to be sure that the signals are sent from the control circuit 26 onto the line at appropriate times within the AC cycle and so that they will not be sent during the zero crossings of the AC signal.

Accordingly, in each room in a hotel there will be placed a control circuit 26 and individual modules 38, 40, 42 and others. The modules will be appropriately placed to control the various light bulbs and electrical appliances within the room. All of the modules in a particular room will be set with a particular digital address code and the control circuit in that room will be also set to send out the same digital code address. When the occupant comes into the room he should appropriately lock the door with the suitable locking system provided which may be either a dead bolt, safety chain, or the like. By suitably locking the door, the door lock switch 10 causes a lock signal to be sent which causes the trigger circuit 12 to change its level from its normally high to a low level. This causes the multivibrator 20 to provide a delay pulse which causes the multivibrator 22 to send out the necessary pulses for the address signal, causing the address switch 24 to trigger the control circuit whereby the address code of the particular modules in that room will be sent onto the AC line at the proper modulation. The multivibrator 22 will also cause the multivibrator 44 followed by 46 to trigger the ON switch 48 whereby the control circuit 26 will send the ON command signal onto the AC line.

Each of the modules 38, 40, 42 are of the type which respond to a particular command signal after they are specifically addressed. Accordingly, the various modules 38, 40, 42 will respond by turning on, thereby permitting the light bulbs and electrical appliances connected thereto to be permanently energized in the normal manner.

It should be appreciated, that the control circuit 26 is of the type that first sends out an address code followed by a command code. The modules, on the other hand, only respond when their particular address code is sent. Then, they respond to the particular command code that is sent. The various commands include turning on, turning off, dim and brighten. However, the wall receptacles and plug in receptacles 40 and 42, which control appliances, only respond to the ON and OFF commands. The wall switch modules 38, which controls light bulbs, and similarly any other module which would control a light bulb, would also respond to the brighten and dim commands.

When the door lock signal terminates, as for example when the individual opens the door lock, the trigger circuit 12 will go back to its normally high condition. Such high output causes multivibrator 52 to trigger. The pulse passes through the OR gate 54 and initiates a timer circuit delay 56. This circuit can be set at any convenient length of time, for example six minutes. The trigger pulse from multivibrator 52 also passes to trigger the timer circuit delay 58 which can also be set at any convenient time less than the time of timer 56, and for example at 4 minutes. Accordingly, at the end of the 4 minute period, the timer circuit 58 will send a pulse which triggers the multivibrator 60 which in turn operates the timer 62 to produce a pulse. The pulse output from timer 62 controls the percentage of dimming which shall take place. The control circuit 26 is set so that the length of a pulse to it controls the percentage dimming. Accordingly, by setting the appropriate pulse width from the timer 62, the percentage of dimming can be set. The output passes through the "dim" switch 64 which causes the control circuit 26 to send out the command onto the AC line which will cause the light bulbs to dim. It should be appreciated, that not all of the modules 38, 40, 42 will respond to the dim switch. As heretofore explained, only modules which control light bulbs will be caused to dim.

The timer 56 continues timing until it reaches its 6 minute time and then triggers the multivibrator 66 through switch 67 causing the multivibrator 68 to produce a delay pulse which is needed for appropriate spacing. The output then triggers the "OFF" multivibrator 70 which controls the "OFF" switch 72 causing the control circuit 26 to send OFF command onto the line. Switch 67 is controlled by a signal "a" from counter 79 as will hereinafter be explained.

The output of the timer 56 and timer 58 is also sent to a gate circuit 82. The gate circuit detects when both outputs indicate that it is during the six minute timing cycle and subsequent to the four minute timing cycle. Specifically, the gate 82 is responsive to the last two minute cycle. It is during this time that the dim signal is sent to the control circuit. At the same time, gate 82 operates the beeper 84. Thus, during the last two minutes, when the light bulbs will dim, a beeper will also be turned on.

The beeper 84 is a standard device that can be purchased. For example, it can be a piezoelectric audio driver as for example is available from Mallory Electric Company in a device called sonalert.

In order to be sure that only the particular modules in the same room will be dimmed and subsequently turned off, the address code is sent out before each of the dim commands and OFF commands. Specifically, at the output of the multivibrator 60, along line 74, a signal is sent to the address switch 24 causing the address code of the modules to be sent out prior to the dim command. Similarly, at the output of the multivibrator 66, along the line 76, a signal will be sent to the address switch 24 to cause the address code of the modules to be first sent out before the OFF comannd. It is for this reason that the necessary delay pulses are needed for proper spacing so as to permit the address signals to go out before the command signals.

It should be appreciated, that the blinking wall delay switch 14 produces only a momentary lock switch signal. Accordingly, upon initiation of the momentary lock signal, the trigger 12 will first go to its low state causing the address code to be sent followed by the ON command which will initially turn on all of the modules. However, since it is only a momentary lock signal, the signal will soon terminate and the trigger will then go back to its normally high state which will cause the multivibrator 52 to trigger which in turn will set the sequence of timers so that after 4 minutes the lights will dim and sound the beeper, and after 6 minutes the lights and appliances will all go out and the beeper will stop.

There is also provided a timer circuit 78 which is set to produce an output pulse at prefixed time intervals. These time intervals can be at any desired length. By way of example, in the present embodiment, it is set at an 8 minute interval. Following that 8 minute interval, it causes the multivibrator 80 to send out a trigger pulse which is sent through the OR gate 54 to again operate the timers 56 and 58. These two timers will again cause the sequence of initially dimming any lights that may be on after 4 minutes as well as sounding the beeper, and after 6 minutes turning off all lights and appliances and the beeper will stop.

By having the timer circuit 78 operate, it is possible to permit the individual modules, and especially the wall switches module 38, to operate even if the door is not locked. Accordingly, if one comes into the room and simply turns on one of the lights or appliances, they will go on. However since the timer is continuously operating, at regular 8 minute intervals, the light bulbs will dim and all appliances will subsequently turn out 2 minutes later.

The output from the multivibrator trigger 80 is sent to a countr 79 which is set to count a prefixed number of cycles, typically 4 cycles. After 4 cycles, the counter produces an output which is sent back to the timer circuit 78 to modify the time constant of the timer circuit to a longer time period. At the same time, the counter 79 produces a signal "a" which controls switch 67 so that the output from timer 56 is now directed up to the multivibrator 22.

Accordingly, when an individual guest enters the room, and should he fail to lock the door and also fail to depress the blinking red light wall switch 14, but instead simply closes a particular light switch or appliance, the light will go on. However, the timer circuit 78 continues on its regular 8 minute cycle which causes the timers 56 and 58 to operate during the course of such cycle so that for 2 minutes during the course of that cycle, the light bulb will dim, the beeper will go on and subsequently it will go out.

However, the timer circuit 78 will only produce such a sequence of 8 minute cycles for a total of 4 times. The counter 79 after realizing that the timer circuit 78 has produced its 8 minute cycle 4 times, now changes the timing delay to a different length of time, typically 1 hour. However, the repetitive 8 minute cycle which repeats for 4 times is sufficient to remind the guest to suitably bolt the door.

In order to prevent the timer 78 from turning off the lights when the door is locked, the timer is set so that it does not perate when the output from the trigger is low, which means that the door is suitable locked. However, it is automatically reset when the trigger turns from a low to a high state, indicating that the door lock has been opened.

The control circuit is so set that when the dim command comes on, if the lights are on, then they will automatically be dimmed. However, if the lights are off, they will initially be turned on followed by the immediate dimming of the lights.

Therefore, after the occupant leaves the room, the door will be unlocked and accordingly the timer circuit 78 will continuously send out its pulses at the 8 minute intervals. The timer will therefore cause the lights to go on at regular 8 minute intervals for 4 intervals. However, they will immediately turn on in a dim situation and will remain on for only the two minute interval. Accordingly, after the occupant leaves the room, the timer 78 will be reset and will begin the 8 minute interval. During those 8 minute intervals, the light bulbs in the room will go on for a 2 minute interval and at a dim light for 2 minutes. After 4 such intervals, the timer will be reset so that the intervals will occur only once every hour.

This situation is a power saving benefit. Thus, if the individual occupant leaves the room and leaves all of the lights on, as well as possibly the air conditioner, or possible even some other appliance such as the TV, normally these appliances and lights will remain ON indefinitely.

However, in accordance with the present situation, after the first 8 minute timing interval, all of the appliances and lights will go out. Subsequently, during the next few timing intervals of timer circuit 78, the light bulb will go on in a dim state for a 2 minute period. However, even that will only continue for another 3 times after which it also will not go on until the hourly cycle has appeared again. Accordingly, the energy savings by turning off all of the appliances in the room even though the occupant left them on results in a great savings.

Because the timer circuit 78 is recycled at an hourly interval after the first four cycles, it is possible to obtain a further benefit therefrom. In many areas, especially in the warm climate, if the air conditioner is left off for the entire day, the room becomes unbearably hot and/or humid. At the same time, the hotel operator does not wish to keep the air conditioning going during the entire day. However, if the air conditioner is shut, the room will be very uncomfortable upon the return of the occupant at some point later in the day. By having the timer circuit 78 recycle on an hourly basis, it is possible to connect the air conditioner to the system by utilizing the proper wall receptacle receiving device 40. The counter 79 sends out a signal "a" which operates the switch 67 causing the output from timer 56 to now be directed upward toward the multivibrator address pulses 22. Therefore, once the counter 79 has completed its count of the four cycles at 8 minutes and it causes the timer circuit 78 to change to its hourly cycle, the switch 67 is turned over so that at the next hour, when timer circuit 78 causes the timer 56 to begin its 6 minute count, that will cause the multivibrator 22 to produce a pulse which in turn operates the multivibrator 44 to commence the turn ON cycle through the multivibrator 46 and ON switch 48. Thus, for 6 minutes the air conditioner will be turned on for each hour. At the end of the 6 minutes all of the lights and appliances will be turned off. However, for the last 2 minutes the timer circuit 58 will still produce its dim signal which will cause the lights to dim for the last 2 minutes of that cycle. Accordingly, the present circuit produces the benefit that there is a power saving by automatically turning off all appliances even though the occupant left on such appliances. However, should the hotel owner desire, he can have the air conditioner turn on for about 6 minutes every hour thereby keeping the humidity and temperature in the room at a suitable level so that when the occupant returns to the room, the heat and humidity in the room will not be at an unbearable level.

It should be appreciated that the interconnection of the switch 67 and controller for counter 79 thereof, is optional thereof. Should the hotel owner desire, that circuit need not be included and the system will operate so that every hour for two minutes the lights will turn on to a dim condition. No other appliances will turn on.

It should also be appreciated, that instead of having the counter 79 change the time constant in the timer circuit 78, alternately it is possible to have the counter 79 completely turn off the timer circuit 78. In this way, only 4 cycles of the timer circuit will continue. After such 4 cycles, no further cycles will continue at all.

The particular option can be determined by a particular hotel owner by simple modification of the circuitry.

During the initial 4 minute delay provided by the timer 58, both the 4 minute timer 58 and the 6 minute timer 56 are operative. During this time, the lights will usually be on. Should the individual at that time suitably lock the door the lock signal will be sent from the switch 10 and will cause the ON command to be set so that the lamps and appliances will remain ON in the room. However, during the last 2 minutes of the cycle, the 4 minute timer 58 will have already caused the lights to dim. The timer 56 will not as yet have turned off the lamps. If the occupant suitably locks the door during this 2 minute interval, it is first necessary to turn the lights fully on and then have them remain in their on state. In order to achieve this, one of the outputs from the multivibrator ON pulse circuit 46 is sent to a multivibrator delay pulse circuit 90 which provides a delay pulse and then sends a signal to the multivibrator brightness pulse circuit 92 to control the brightness switch 94 which sends a signal to the control circuit 26 to brighten the light bulbs.

Accordingly, each time an ON signal is sent, the signal causes the control circuit to turn on the light bulbs and appliances. After suitable delay provided by the delay circuit 90, a brightness pulse is sent. If the lights are turned on completely and are already bright, the brightness pulse will not effect the light. However, in the situation where the occupant turns on the lights during the last two minute interval when the lights have been dimmed, the brightness pulse will first brighten the lights and then keep them on as a result of the ON switch signal.

The operation of the system will now be explained. When the occupant comes into the room, there will be provided in a suitably visable location at the entry of the room the blinking illuminated wall delay switch 14. Typically, this will be a red blinking push button switch which might have an inscription associated with it reminding the individual to lock the door. If the individual then proceeds to immediately lock the door, the door lock switch 10 will send the signal which will cause the control circuit to initially send the address code of all the modules in the room followed by the "ON" command which will energize all of the modules thereby permitting the lamps and electrical applainces to all be permanently turned on at the need and desire of the occupant. The door lock switch also serves to stop the blinking of the push button switch 14.

On the other hand, should the occupant fail to lock the door and should he instead hit the blinking wall push button switch, he will cause the switch 14 to produce a momentary lock signal. This will initially cause the control circuit to send out the address code for all the modules in the room followed by the "ON" command which will thereby energize all of the modules so that the lamps and appliances can be turned on. However, it will also cause the timers 56 and 58 to begin their sequence whereby after 4 minutes the light bulbs in the room will begin to dim and the beep sound will be heard, and after 6 minutes all of the light bulbs and appliances will go out and the beeping will stop. Each time the occupant depressed the red blinking wall switch this sequence will again be repeated with the light bulbs and appliances being energized followed by the light bulbs dimming and the beep occurring after 4 minutes and the light bulbs and appliances turning off after 6 minutes and the beeping stop. Such continued sequence will, of course, be a continuous reminder to the occupant to suitably lock the door.

When the occupant locks the door, if it is during the initial four minutes, the light bulbs and appliances will just continue remaining on. If it is within the last 2 minutes during which time the light bulbs are dim, the light bulbs will go back on at full brightness.

Should the occupant fail to both lock the door and also fail to depress the blinking push button switch, and on the other hand, should he simply turn on one of the individual lights or appliances, such light or appliance will go on. However, the timer circuit 78 will be recycling. Depending upon the point within the cycle at which the occupant turned on the individual light or appliance, the light will soon dim and go out and/or the appliance will soon go out. The cycle will be a repetitive 8 minute cycle for 4 such cycles and then become a 1 hour cycle. During these cycles a light will go on dimly for 2 minutes and at the end of the cycle lights and appliances all will go out. Accordingly, even when the occupant will again be reminded that he must bolt or suitably lock the door.

By providing the circuitry that individual lights and appliances will go on, it avoids the possible situation whereby the occupants may fail to lock the door and may simply turn on a particular lamp, as for example, in the bathroom. At the conclusion of the 8 minute cycle, that light will go out. The occupant may not be in a position to go over to lock the door, however, he requires illumination. It is therefore possible that he can again turn on the individual light and it will go back on. However, it will only give him another 8 minutes until the cycle repeats itself. Such 8 minutes would be sufficient for the individual to get over to the door and properly lock it.

Should the individual occupant enter the room, fail to close the door, and at the same time either turn on an individual light or depress the blinking button, whereby he obtains illumination for a limited period of time, and should he immediately go to bed during this time, there is again provided a reminder that he has failed to lock the door. Therefore, even if the occupant went to bed and turned off the individual light switch, at the end of the timing cycle, the lights will turn on and remain dim for 2 minutes and then turn off. This will continue at the 8 minute interval. This continuous turning on of the lights and beeping should be sufficient annoyance to again remind the occupant that he has failed to lock the door and only by locking the door will he be able to maintain the lights in the desired off state.

When the individual leaves the room, the door lock signal will be off and accordingly while the occupant is out of the room, the timer circuit 78 will continuously provide the 8 minute interval during which time the lights will go on and remain dim for 2 minutes and then subsequently turn off. Of course, it should be appreciated, that since only one wall switch will be so energized, there is provided a very limited drain of electricity in the room. At the same time, the system will automatically turn off all of the other appliances. Therefore, after the individual leaves the room, at the end of the cycle, all appliances will be turned off. Accordingly, if the individual leaves on any lights, the air conditioner, the television, or for that matter any other appliance, they will automatically be turned off at the conclusion of the timing cycle. It is therefore appreciated that in addition to providing a safety feature, the present system can also provide a saving in energy cost since all appliances will be automatically turned off when the occupant leaves the room.

However, as previously explained, this 8 minute cycle only continues for 4 cycles. After that, it changes the timer to a 1 hour cycle count. Therefore, even the small drain of electricity provided by the 8 minute cycle is eliminated. Furthermore as heretofore explained, the air conditioner an be associated with the turning on of the 1 hour cycle so that for approximately 6 minutes each hour the air conditioner will turn on and keep the room in a relatively cool and reduced humidity state.

Should the central office or main desk desired to completely disable a room and prevent any lamps or appliances from turning on, there can be provided a main control switch at the central desk or office which can selectively place any room in a completely disabled condition preventing any lights or appliances from turning on. Specifically, the multivibrator 46 which provides the ON pulse can be grounded by means of a switch 86 located at the main desk. By grounding the multivibrator it prevents it from producing any ON pulses whereby it will not be possible to turn on the equipment within the room. This type of arrangement can be used whenever certain rooms are out of service and the management want to be sure that no one who is unauthorized goes in and utilizes the room without permission. By simply utilizing the switch 86, they can completely disable any room and prevent any appliances from being turned on in the room.

It should also be appreciated, that it is not necessary to have every electrical appliance in the room connected to the system. For example, refrigerator units, electric clocks, or other types of equipment can be utilized in the room without placing one of the modules in association with the equipment. As a result, that particular piece of appliance or equipment will not be controlled and can be maintained on despite the presence of the security system.

When the maid or repairman requires the use of the room for a continued period of time, the laws often require that they keep the door to the room opened while they are working in the room. For permitting them to use the room with the door open and at the same time keep the lights and appliances on continuously during the course of the cleaning and repairing of the room, there is provided the bypass switch 18. This switch can be a simple jack type switch placed in parallel with the door lock switch 10. When the maid or repairman comes into the room, they can insert a jack into the socket 18 which will cause a continuous lock signal to be sent so that all of the electrical equipment and lights will be maintained in their on state as long as the bypass switch is on. When the maid or repairman leaves the room, they pull out the bypass switch and again the security system is activated.

A similar arrangement can also be provided for particular occupants who cannot lock the room with ease. For example, when an occupant has children who are continuously coming in and out of the room at regular intervals, it may be inconvenient to continuously lock the door. The management may therefore come up and insert their own bypass switch to bypass the present system.

The standard remote control system which can be readily purchased has availability for a total 256 different address codes. Therefore, utilizing such system, a total of 256 different rooms can be accommodated with each room having its own address code. In this way, no interference will be had between one room and the next room. Each central control circuit would send out an address code particularly identifying only the modules within that room and would thereby not effect the modules in any other room.

The present system is set so that the codes are sent at a 120 KHz modulation signal over the 60 cps AC line. Should a particular hotel facility have more than 256 rooms, it is possible to adjust the frequency by tuning it at spaced apart intervals on either side of the 120 KHz frequency. At each particular frequency, a total of 256 address codes can be provided. Accordingly, the modules will also be tunable at a particular frequency. Therefore, when a control circuit sends out a particular address code, it will be modulated at a particular frequency and the receiver will first detect the frequency and then the address code. As a result, a considerably larger type hotel facility can still be accommodated using the present system.

In order to avoid any interference between any other electrical equipment in the hotel which may be providing signals on the line, filters can be placed in connection with the circuit breakers of each room. In this way, there can be avoided any turning on and off of the lights and appliances in error.

By utilizing isolation filters, it is also possible to achieve greater than the 256 codes. For example, many hotel rooms have one, or at most two or three rooms connected with a common circuit breaker. By placing the filter after each circuit breaker, those few rooms associated with the particular circuit breaker are isolated from all other rooms associated with different circuit breakers. It is now possible to utilize a particular set of codes just for those one, two or three room connected from the common circuit breaker. In this way, not only can each room be given in its own address code, but actually each and every wall socket, receptacle, and appliance in the room can be given its own address code. As a result, it is possible to not only address each room individually, but it is even possible to address each particular appliance in the room.

With this arrangement, it might be feasible to also utilize a common controller which can be given to the occupant whereby he can specifically control any particular appliance, light, or other electrical piece of equipment in the room without having to get off his bed or chair. This can be done by utilizing the present remote control system. At the same time it avoids the necessity of having individual wires placed throughout the room. Simply by placing the particular receptacles as heretofore described, it is possible to individually control each unit.

The present system can be initially wired into a hotel during its construction. However, it can also be simply added to existing hotels without difficulty. The individual modules can be simply inserted in the electrical box in place of the standard wall switch or receptable unit. The door switch can be easily connected to the particular type of locking system provided and the particular main controller can be easily installed in each room at a suitable location and simply plugged into any available outlet. Therefore, no destruction of the rooms are necessary in order to install the present system.

In addition to placing the control box in each room, it is possible to have one rack of control boxes located at a common central location within the hotel. This would be possible during initial construction whereby a single telephone wire is directed from the central control station having all of the control units to each individual room. Alternately, in those hotels where wiring is easy, the central station having all of the centrol control units can be utilized and the wires run to each room.

There has been disclosed heretofore the best embodiments of the invention presently contemplated. However, it is to be understood that various changes and modifications may be made thereto without departing from the spirit of the invention.

I claim:

1. A Powersaving Room Security System, comprising:

switch means for coupling to a door locking system for generating a lock signal congruous to proper locking of the door;

a central control unit for producing control signals capable of transmission through the room AC lines, module units for respective connection to various electrical receptacles and wall switches in the room and responsive to said control signals for correspondingly controlling the respective receptacles and wall switches, circuit means coupled to said central control unit for limiting permanent energization of lights and appliances coupled to respective module units in the room to the occurrence of said lock signal and for permitting only temporary energization of at least selected ones of the lights and appliances coupled to respective module units in the room in the absence of said lock signal, and means for promoting proper locking of the door.

2. A Powersaving Room Security System as in claim 1, wherein said control signals comprise an address code selectively identifying the particular room such that other rooms will not be effected by the control signals, and a command code controlling the state of the receptacles and wall switches.

3. A Powersaving Room Security System as in claim 2, wherein said command codes are selected from the group consisting of on, off, brighten and dim.

4. A Powersaving Room Security System as in claim 1, wherein said circuit means comprises first delay means coupled between said switch means and said central control unit for providing a first delay period, and wherein said control signals include an enabling signal and a disabling signal, said control unit being directly responsive to the initiation of said lock signal for producing the enabling signal, and responsive through said first delay means to the termination of said lock signal for producing the disabling signal after the first delay period.

5. A Powersaving Room Security System stem as in claim 4, wherein said circuit means comprises a second delay means coupled between said switch means and said central control unit for providing a second delay period shorter than said first delay period, and wherein said control signals further include a dimming signal, said control unit being further responsive through said second delay means to the termination of said lock signal for producing the dimming signal after the second delay period.

6. A Powersaving Room Security System as in claim 5, wherein said promoting means comprises audible means coupled to said second delay means for producing an audible sound after termination of said second delay period and until termination of said first delay period.

7. A Powersaving Room Security System as in claim 5, wherein said circuit means comprises timing means coupled to said first and second delay means for providing a repetitive timed trigger signal to cause said central unit to correspondingly produce said dimming signal and said disabling signal respectively after said second and first time periods, said timing means being disabled by the presence of said lock signal and being reset by termination of said lock signal.

8. A Powersaving Room Security System as in claim 7, wherein selective ones of said modules permit temporary local energization from the AC lines even in the absence of said lock signal, and to respond to said dimming signal and said disabling signal to correspondingly dim and then turn off any light connected thereto.

9. A Powersaving Room Security System as in claim 7, wherein said control signal further includes a brightness signal, and including a brightness circuit means for initiating said brightness signal subsequent to the production of an enabling signal, whereby during the interval between said second and said first delay period the lights will dim upon the occurrence of a lock signal.

10. A Powersaving Room Security System as in claim 7, wherein said circuit means comprises counter means coupled to said timing means for counting a predetermined number of timing cycles and then modifying the length of the cycle time of said timing means.

11. A Powersaving Room Security System as in claim 6, wherein said promoting means comprises a reminder switch coupled in parallel across said switch means for producing a momentary lock signal, whereby initiation of said momentary lock signal will produce said enabling signal and the termination will produce said dimming signal and the audible sound after said second delay period followed by said disabling signal after said first delay period.

12. A Powersaving Room Security System as in claim 11, wherein said reminder switch comprises illumination means and including blinking means coupled to said illumination means for producing a blinking illuminated reminder switch.

13. A Powersaving Room Security System as in claim 1, including a bypass switch coupled in parallel across said switch means for producing said lock signal even when the door is not locked.

14. A Powersaving Room Security as in claim 1, wherein said circuit means comprises inhibit means coupled to said central control unit for inhibiting the production of at least some of the control signals thereby preventing energization of any lights and appliances.

15. A Powersaving Room Security as in claim 1, wherein said control signals are pulse code modulation signals which are transmitted at fixed frequency onto the AC lines.

16. A Powersaving Room Security as in claim 15, including frequency timing means in said central control unit for selecting said fixed frequency at a desired value, and wherein said module means comprise tunable frequency receiving means for selectively setting the receiving frequency.

17. A Powersaving Room Security System as in claim 1, wherein a separate control unit is provided for each room, and including means for encoding the control signals from a control unit to effect only the module units in that room.

18. A Powersaving Room Security System as in claim 1, wherein said central control unit is located at a central station and is in control of a plurality of rooms to which it is interconnected.

19. A control system for controlling lights and appliances within a room, comprising:

a central control unit associated with the room for producing control signals including an ON signal, an OFF signal, a DIM signal and a BRIGHTNESS signal, capable of transmission through the room AC lines, and module units respectively associated with each light and appliance, each and every module unit being respectively responsive to all of said control signals for correspondingly controlling a particular aspect of the operation of all the respective lights and appliances, whereby all the lights and appliances can be suitably operated by said central control unit.

* * * * *